US008800949B2

(12) United States Patent
Schebaum et al.

(10) Patent No.: US 8,800,949 B2
(45) Date of Patent: Aug. 12, 2014

(54) VEHICLE SEAT MEMORY TRACK ASSEMBLY WITH EXTERNAL RELEASE

(75) Inventors: Andre Schebaum, Steinhagen (DE); Michael Wojatzki, Ennigerloh (DE); Hans-Peter Mischer, Bad Meinberg (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 13/983,326

(22) PCT Filed: Feb. 28, 2011

(86) PCT No.: PCT/US2011/026477
§ 371 (c)(1),
(2), (4) Date: Aug. 2, 2013

(87) PCT Pub. No.: WO2012/118475
PCT Pub. Date: Sep. 7, 2012

(65) Prior Publication Data
US 2013/0334390 A1 Dec. 19, 2013

(51) Int. Cl.
*F16M 13/00* (2006.01)
*B60N 2/07* (2006.01)
*B60N 2/08* (2006.01)
*B60N 2/12* (2006.01)

(52) U.S. Cl.
CPC .............. *B60N 2/0722* (2013.01); *B60N 2/07* (2013.01); *B60N 2/0831* (2013.01); *B60N 2/0705* (2013.01); *B60N 2/0715* (2013.01); *B60N 2/0818* (2013.01); *B60N 2/0843* (2013.01); *B60N 2/123* (2013.01)
USPC ..................... 248/429; 297/341; 297/344.1

(58) Field of Classification Search
USPC ............ 248/424, 429, 430, 423, 29; 297/341, 297/344.1, 378.1, 378.12, 394; 296/65.13
See application file for complete search history.

(56) References Cited

U.S. PATENT DOCUMENTS

| | | | | |
|---|---|---|---|---|
| 3,105,669 | A * | 10/1963 | Pickles | 248/394 |
| 4,844,542 | A * | 7/1989 | Humer | 297/341 |
| 4,881,774 | A * | 11/1989 | Bradley et al. | 297/341 |
| 6,767,063 | B1 * | 7/2004 | Abdella et al. | 297/378.12 |
| 8,517,328 | B2 * | 8/2013 | Wieclawski et al. | 248/429 |

FOREIGN PATENT DOCUMENTS

| | | |
|---|---|---|
| WO | 2007/094011 A2 | 8/2007 |
| WO | 2010/080593 A1 | 7/2010 |
| WO | 2010/080597 A1 | 7/2010 |

\* cited by examiner

*Primary Examiner* — Tan Le
(74) *Attorney, Agent, or Firm* — Brooks Kushman P.C.

(57) ABSTRACT

A vehicle seat memory track assembly including two pairs of upper and lower seat rails that are positioned on opposite sides of a seat bottom of a vehicle seat, a seat track locking system, and a first actuator is operably connected to the seat track locking system. The first actuator includes a release lever positioned externally to the nested upper and lower seat rail pairs, and movable from a non-activated position to an activated position whereby the release lever causes an activation bracket to disengage the seat track locking system to allow slidable longitudinal movement of the seat to a different desired seating position. A memory system, when activated, records the longitudinal travel of the seat.

5 Claims, 9 Drawing Sheets

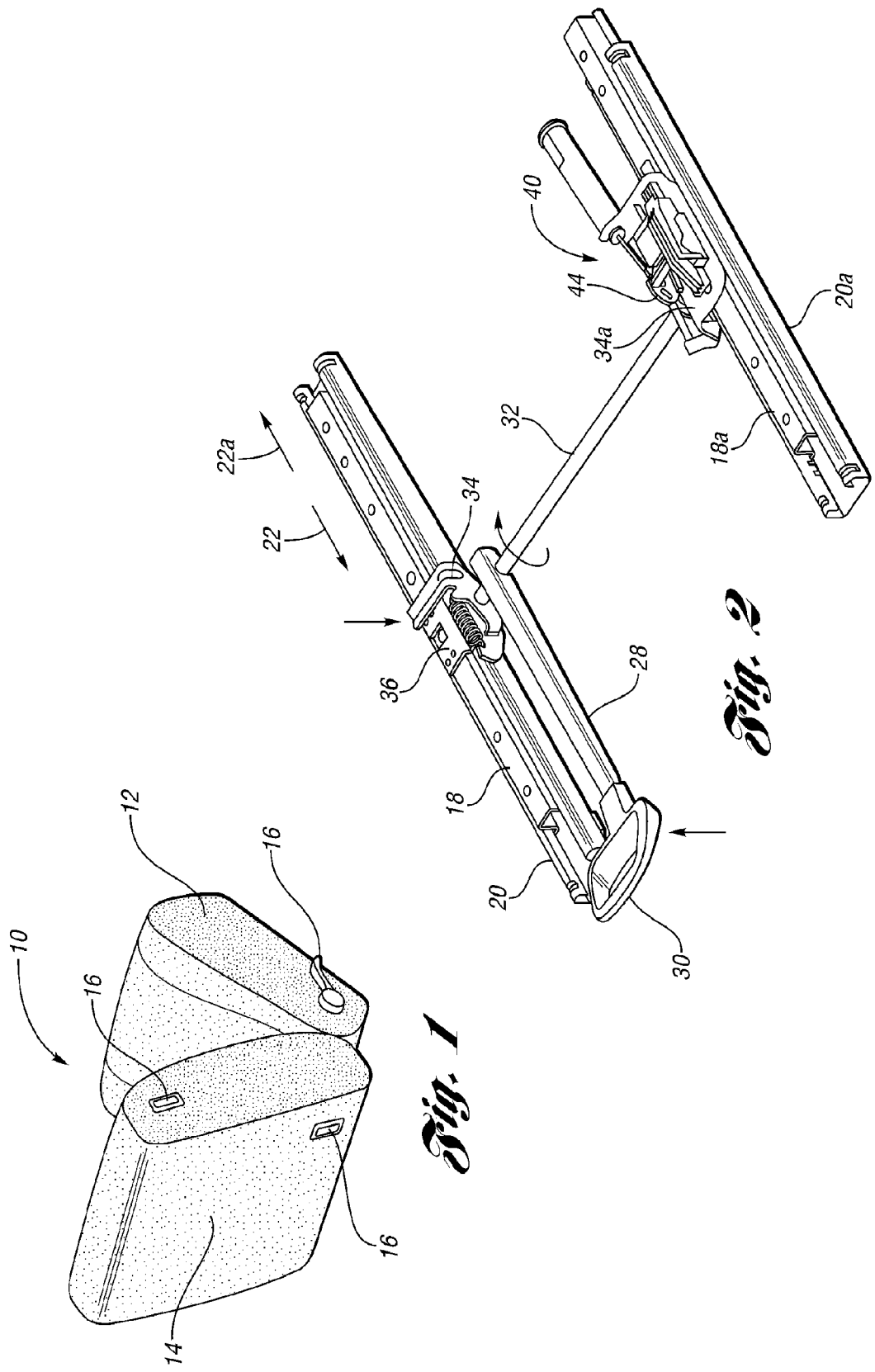

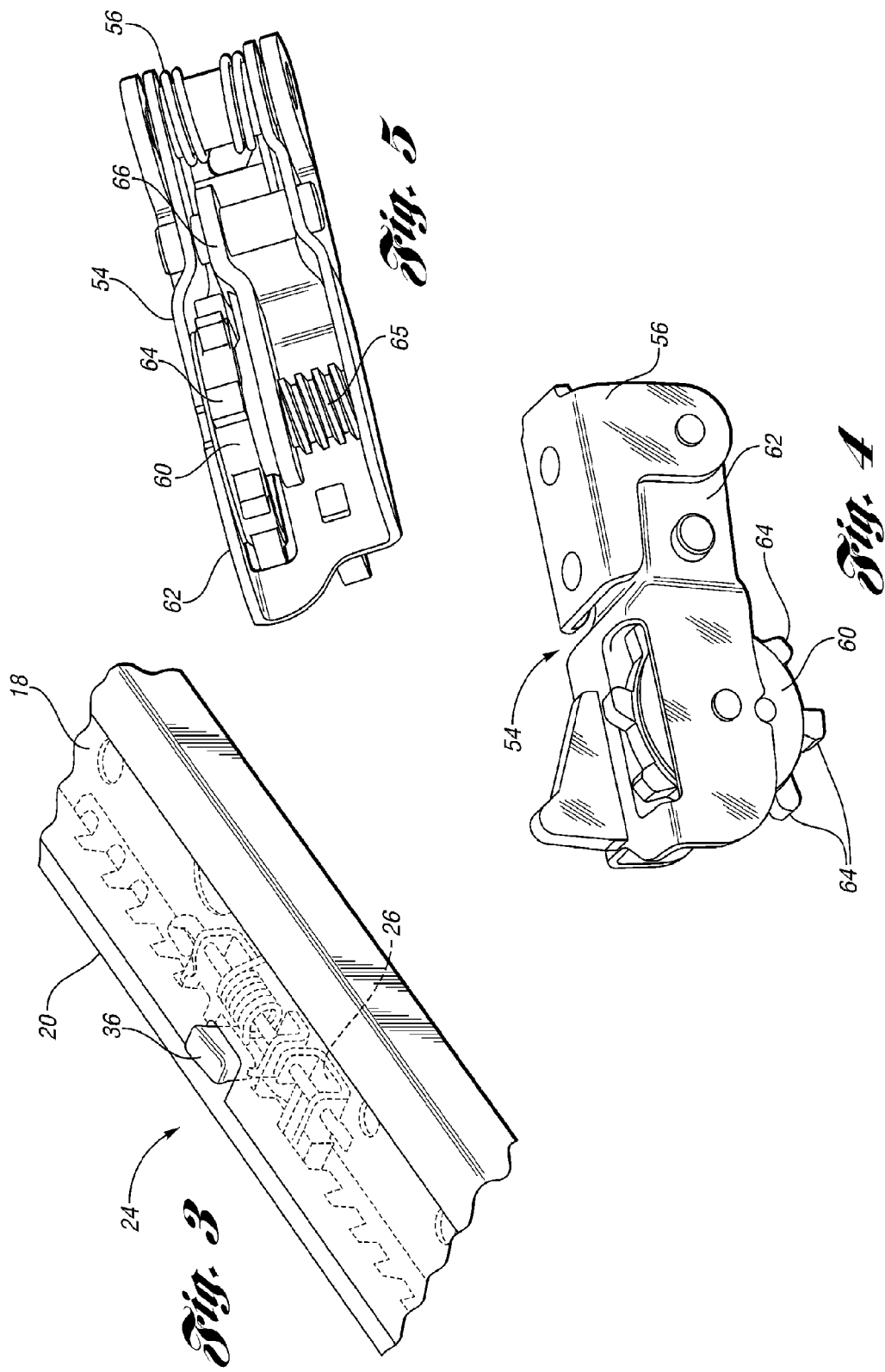

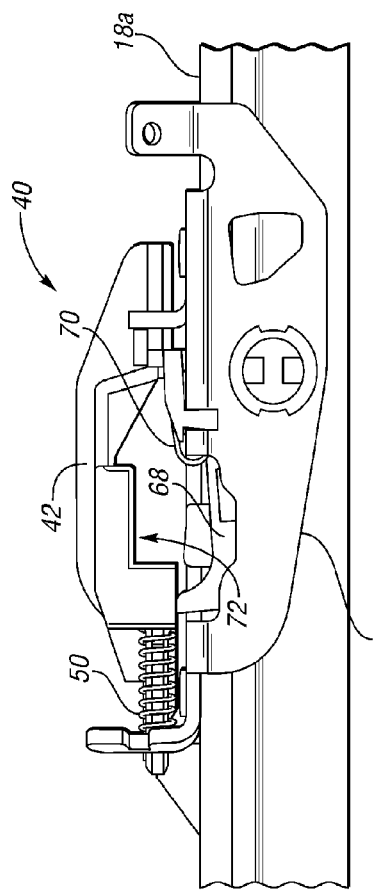
Fig. 10
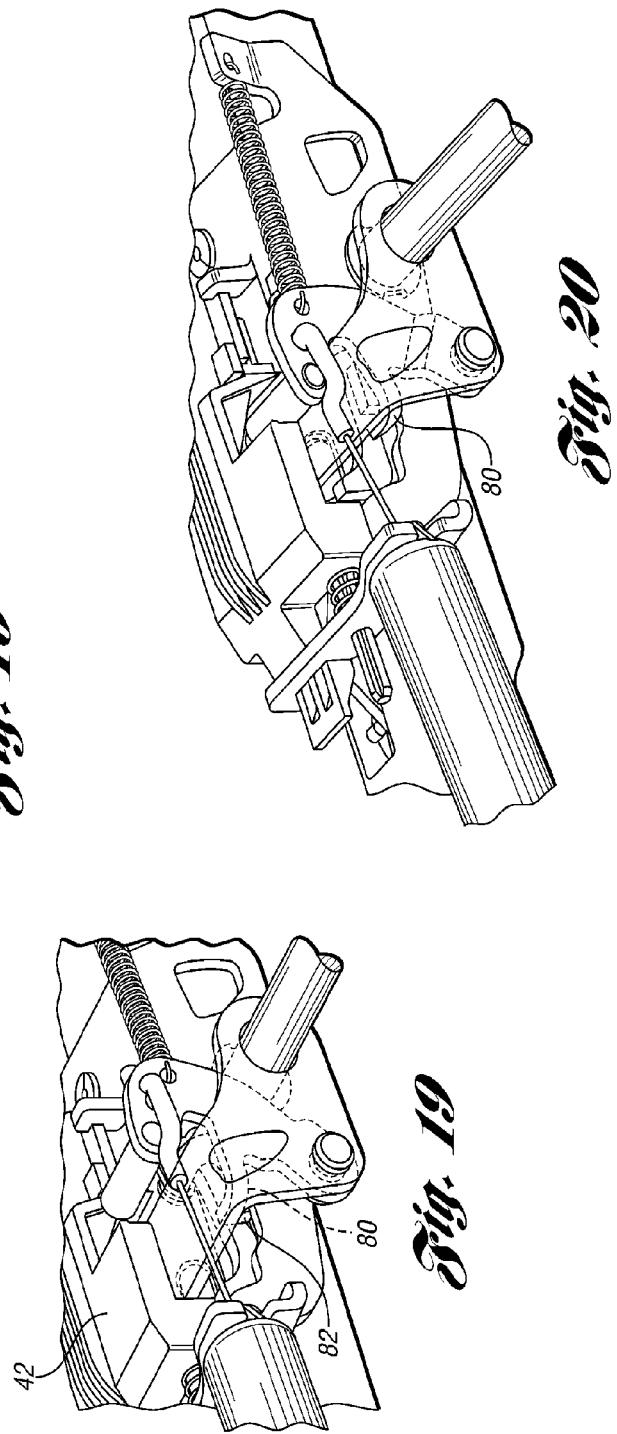
Fig. 20
Fig. 19

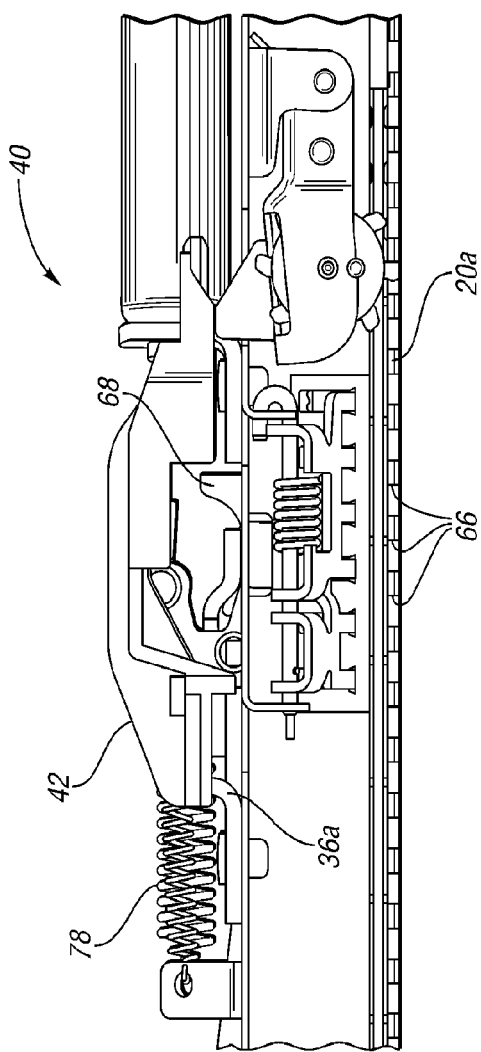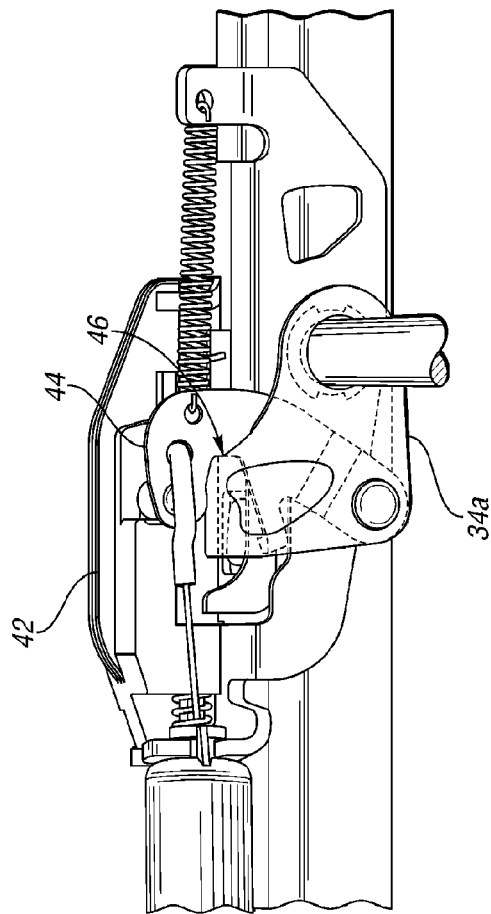

VEHICLE SEAT MEMORY TRACK ASSEMBLY WITH EXTERNAL RELEASE

CROSS-REFERENCE TO RELATED APPLICATION

This application is the U.S. national phase of PCT Application No. PCT/US2011/026477 filed on Feb. 28, 2011, the disclosures of which is incorporated in its entirety by reference herein.

BACKGROUND

Vehicles such as passenger cars typically include seats for the use of the driver and other occupants. In many vehicles, the position of the seats may be adjusted for the comfort of the occupants. Adjustment options, particularly for the first row of seats, typically include the capability to move the seat in fore and aft directions by operation of a track assembly which mounts the seat to the vehicle floor. These existing systems typically employ a generally U-shaped comfort adjustment bar (also known as a "towel bar") which is operatively connected to the seat track locking system. Each of the legs of the U shaped towel bar extend, respectively, into the openings formed between first and second sets of upper and lower tracks, with one or more of the ends operatively connected to release the track locking system to unlock the seat from the lower track when the end portion of the towel bar is raised, thereby allowing the occupant to slidably position the seat along the length of the tracks as desired. One such adjustable seat track assembly is disclosed in PCT Publication No. WO 2010/080597 A1.

Some vehicle seats, particularly first row seats, may include the capability of folding the seatback forward then sliding the entire seat forward to facilitate access to the second row of seats. This is known as an "easy entry" option, and is commonly seen in two-door vehicles. The easy entry option allows the generally upright back portion of the seat to be dumped, or pivoted, forward from its normal position, at the same time unlocking the seat to allow the seat to be slidably positioned forward in the passenger compartment to provide more spaced behind the seat to gain entrance into the second row of seats.

Seats which include an easy entry capability may also include a memory system, typically disposed in one of the pair of seat tracks, and configured to remember a longitudinal position of the corresponding upper track with respect to the corresponding lower track such that, whenever the seatback is dumped forward and the seat slid forward for easy entry to the second row, and the seat is thereafter slidably positioned rearward for use by the front row occupant, the sliding seat automatically stops and locks at the previously selected use position. Vehicle seats including easy entry capabilities with position memory systems are disclosed in PCT Publication No. WO 2010/080593 A1.

SUMMARY

The disclosed system includes a vehicle seat memory track assembly including two pairs of upper and lower seat rails that are positioned on opposite sides of a seat bottom of a vehicle seat. Each lower rail is fixedly attachable to a vehicle support structure, such as a vehicle floor, and each upper rail is fixedly attachable to the seat bottom and slidably mounted in a respective lower seat rail. The disclosed system further includes a seat track locking system including two track locking assemblies, each one disposed in one of the pairs of tracks, and each track locking assembly being configured to lock a respective upper rail in a variety of longitudinal positions with respect to its corresponding lower rail. A first actuator is operably connected to the seat track locking system. The first actuator includes a release lever positioned externally to the nested upper and lower seat rail pairs and operably connected to an activation bracket, which is movable from a non-activated position to an activated position, whereby the activation bracket disengages the seat track locking system to allow slidable longitudinal movement of the seat to a different desired seating position.

The disclosed system includes a memory system which is mounted on one of the upper rails and is engageable with the corresponding lower rail whenever the memory system is activated, such as when the seatback is folded forward and the seat slidably positioned forward to allow an occupant to gain entry to the second row of seats. When activated, the memory system records the longitudinal travel of the seat, so that after entry to the second row is gained and the operator slides the seat rearward along the lower rails, the memory system stops the seat at the same use position that the seat was in prior to folding and moving the seat for easy entry.

The memory system is operable via a second actuator which includes an activation lever mounted externally of one of the pair of rails for movement from a disengaged position to an engaged position with the other of the pair of rails in which the memory module is activated to record the use position from which the seat may then subsequently be moved to allow for entry into the second row of seats. The activation lever is also operably connected to the first actuator to disengage the seat track locking system when the memory system is activated, to allow forward movement of the seat from the user-selected location to a more forward location, and thereafter allow rearward movement of the seat back to, but not past, the user-selected location.

BRIEF DESCRIPTION OF THE DRAWINGS

FIG. 1 is a rear perspective view of a bucket seat;

FIG. 2 is a perspective view of the one embodiment of the disclosed vehicle seat memory track assembly;

FIG. 3 is a perspective view of a portion of the seat track assembly of FIG. 2, showing the track lock activation member;

FIG. 4 is a perspective view of the disclosed memory module;

FIG. 5 is a lower view (when installed) of the memory module;

FIG. 10 is a side elevation overview of a portion of the track assembly (on the memory system side);

FIG. 13 is a side elevational cross-sectional view of the track assembly (on the memory system side) showing the memory system in the activated position;

FIG. 14 is a side elevational view of the track assembly (on the memory system side) from the opposite side of the track shown in FIG. 13;

FIG. 19 is an elevational view of the track assembly (on the memory system side) from the side of the track shown in FIG. 18, showing the relative positions of the activation bracket, activation lever, and the reset lever when the memory system is reset by operating the release lever; and FIG. 20 is an elevational view of the track assembly (on the memory system side) from the side of the track shown in FIG. 18, showing the relative positions of the activation bracket, activation lever, and the reset lever when the backrest is dumped forward and the activation lever has been rotated rearward by the Bowden cable.

DETAILED DESCRIPTION

Figure 6:
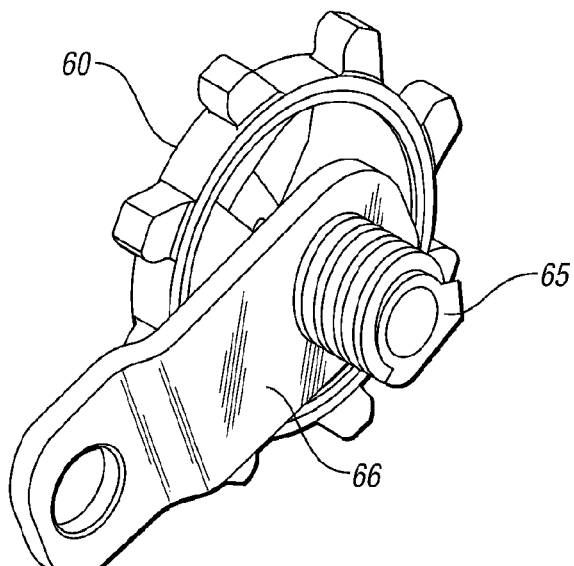
FIG. 6 is an isolated view of the memory module gear wheel, end stop, spindle, and memory nut.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, the disclosed vehicle seat memory track assembly may be used with a vehicle seat, such as bucket seat 10, or other similar type seat commonly installed as the front row of seats in a vehicle. The bucket seat 10 includes a seat portion 12 and a backrest 14. Each of the seat portion 12 and the backrest 14 may be cushioned and upholstered with a suitable fabric, vinyl, or leather cover for aesthetics and the comfort of the seat occupants. The backrest 14 may be attached for pivotal rotation relative to the seat portion 12 to provide a variety of inclination positions for the seeded occupant. The backrest 14 may also be rotatable between an inclined, use position and a collapsed (or dumped) position, folded forward over the seat portion 12 to provide more space within the vehicle for ingress, egress, or stowage. The pivotal movement of the backrest 14 relative to the seat portion 12 may be accomplished by actuating one of one or more handles 16 which are operably connected to a backrest adjustment mechanism (not shown) to adjust the inclination of, and/or dump, the backrest 14.

Referring now to FIG. 2, the seat track memory system may include at least one pair of upper and lower rails, 18 and 20 respectively. In the illustrated embodiment, the seat track memory system includes two pairs of upper and lower rails, 18, 20 and 18a, 20a, arranged in a spaced-apart, generally parallel configuration on opposite sides of the seat bottom 12. Each lower rail 20, 20a is fixedly attached to a vehicle support structure, such as a vehicle floor. Each upper rail 18, 18a is fixedly attached to the seat bottom 12 and slidably mounted in a respective lower seat rail 20, 20a for movement of the upper rails 18, 18a and, thus, the seat, relative to the floor of the vehicle.

Referring now to FIGS. 2 and 3, the disclosed system includes a seat track locking system including at least one locking assembly 24 (shown in FIG. 3) connected to one of the pair of upper and lower rails and operable to lock the upper rail 18 from movement with respect to the lower rail 20 when the locking assembly 24 is engaged. The disclosed system employs a pair of locking assemblies (each as shown as 26 in FIG. 3), one each mounted on upper rails 18, 18a, each operable to move from a disengaged condition during which each of the upper rails 18, 18a may be slidably positioned within lower rails 20, 20a, and an engaged position during which each of the upper rails 18, 18a is locked in one of a plurality of selectable longitudinal locations with respect to lower rails 20, 20a. Further details relating to the structure and operation of similar seat track locking systems are disclosed in PCT Publication No. WO 2010/080597 A1, the disclosure of which is hereby incorporated herein by reference.

A first actuator is operably connected to the seat track locking system, and is movable between a non-activated position and then activated position whereby the seat track locking system is disengaged to allow slidable longitudinal movement of the seat. In the disclosed system, the first actuator includes a release lever 28, which may include a handle 30 attached at the outboard end (i.e., the end nearest the forward edge of the seat bottom 12). The release lever 28 is attached at its inboard end to a crossbar (or tube) 32 that is rotatably connected at each end, respectively, to support brackets 36, 36a, which support brackets 36, 36a are fixedly secured (such as, for example, by welding) to their corresponding upper rails 18, 18a. The release lever 28 is fixedly connected to the crossbar 32 such that upward lifting of the lever handle 30 rotates crossbar 32.

Figure 7:
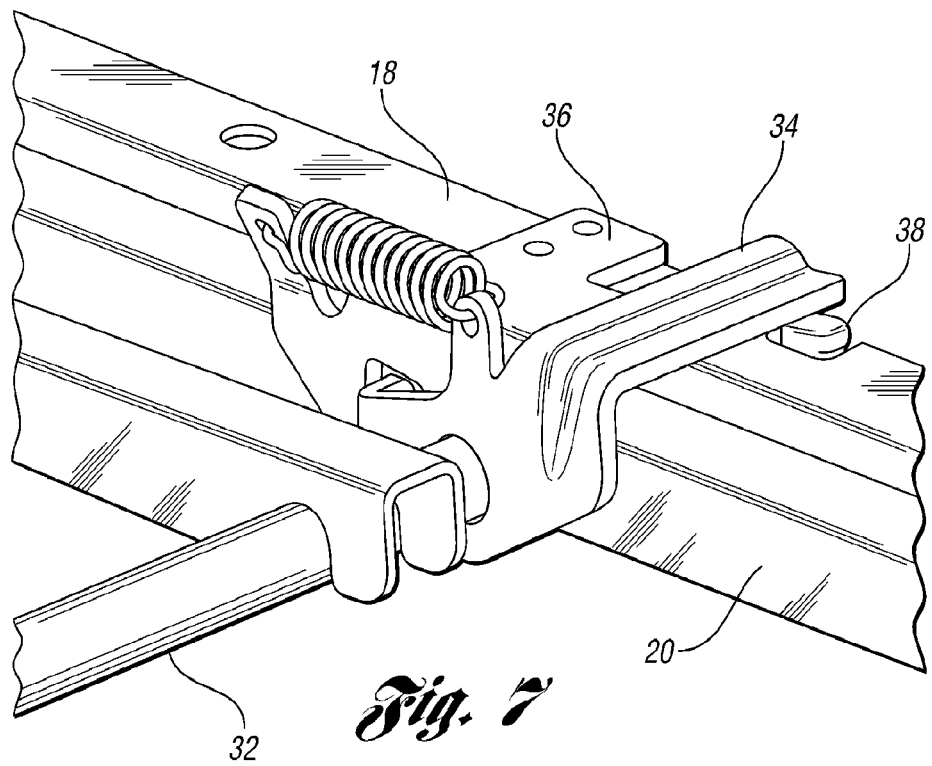
FIG. 7 is a partial perspective view of a portion of the track assembly (on the non-memory side) showing a portion of the seat track locking system release mechanism.

As illustrated in FIGS. 2 and 7, the first actuator also includes an activation bracket 34, 34a associated with each pair of upper and lower rails. Each activation bracket 34, 34a is fixedly mounted on the end of the crossbar 32 adjacent and exterior to its associated pair of upper and lower rails for rotation from a first, disengaged position (shown, for example, in FIG. 12) to a second, engaged position (as shown, for example, in FIGS. 2, 7, and 18) at which each activation bracket 34, 34a presses an activation button 38 which is connected to each track locking assembly 24 associated with each pair of upper and lower rails, and which, when depressed, causes each track locking assembly 24 to disengage, allowing rails 18, 18a to be slidably positioned with respect to rails 20, 20a.

It will be appreciated that the disclosed release lever 28 can be fabricated of metal or rigid plastic and formed with a tubular or u-shaped cross-section that is relatively larger in cross-section than prior towel bar-type actuators, since the release lever 28 is mounted externally of the upper and lower rail pairs, rather than extending into the opening between a nested upper and lower rail pair. This provides a firmer, more robust feel for the operator. Also, since the release lever 28 is mounted externally of the upper and lower rail pair, the lever can be moved over a wider angle of rotation during activation than prior towel bar-type actuators, which are typically nested within, and confined by, the upper and lower rails, and therefore provide a relatively limited range of motion within the rail pair.

Referring now to FIGS. 2, 8, 10, and 13, the disclosed system includes a memory system, generally indicated as 40, mounted on one of the upper lower pairs of rails 18a, 20a which, when engaged, disengages the track locking system, and records the last use position of the vehicle seat to allow for forward movement of the seat from the user selected location to a more forward location (such as, for example, when the backrest 14 is dumped to allow ingress or egress to or from, respectively, a rearward seat), and thereafter return rearward to, but not past, the recorded user-selected location.

Figure 9:
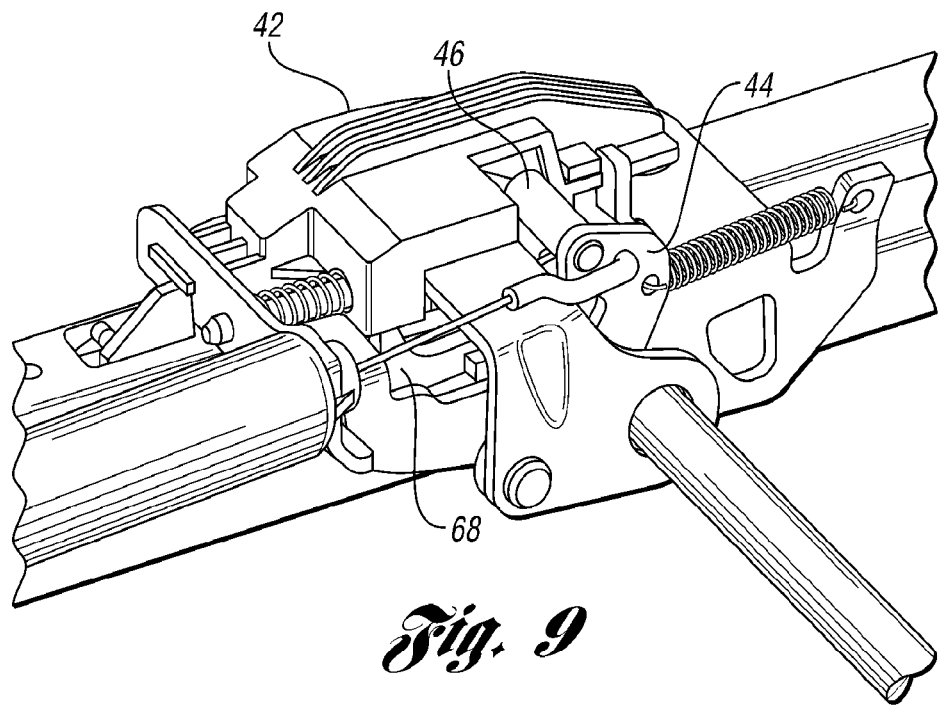
FIG. 9 is a partial rearward perspective view of the portion of the track assembly shown in FIG. 8.

The disclosed memory system 40 includes a sled 42, mounted for slidable movement on mounting bracket 36a, which mounting bracket 36a is fixedly secured to upper rail 18a. Memory system 40 also includes a second actuator which may include an activation lever 44 which is pivotally mounted on activation bracket 34a and includes a guide post 46 which extends across the top surface of the upper rail 18a. The activation lever 44 is biased by spring member 50 into a refracted position (as shown in FIGS. 2 and 9) when the memory system 40 is deactivated. A Bowden cable 52 connects the activation lever 44 to the back rest 14 such that, when the back rest 14 is dumped forward, the Bowden cable is refracted, thereby pulling the activation lever 44 rearward (i.e., toward the back of the seat). When actuated by the retracting Bowden cable, the guide post 46 on the activation lever 44 moves into contact with the facing surface 48 of the sled 42, thereby slidably positioning the sled in a rearward direction.

It should be noted that, although the disclosed system employs the Bowden cable 52 and sled 42 in an orientation in which the cable retracts, and the sled moves, in a rearward direction to activate the memory system 40, it is contemplated that the disclosed orientation of these components may be altered or reversed to facilitate these motions in the forward direction to activate the memory system 40. Also, components which are described in this disclosure as moving "downward" or "upward" in their operation, may alternatively be oriented such that they perform the described functions through motions in the direction opposite from the directions disclosed in the specific embodiments described herein.

Referring to FIG. 14, when the seat back 14 is dumped forward and the Bowden cable actuates activation lever 44 to urge sled 42 towards the activated position, activation lever 44 is simultaneously brought into contact with activation bracket 34a. As activation lever 44 rotates rearward it bears upon activation bracket 34a (at location 46, shown in FIG. 14) rotating activation bracket 34a into position to depress actuation button 38, thereby releasing the seat track lock system. Thus, when the seatback 14 is dumped forward the rotation of activation lever 44 simultaneously moves the sled 42 of the memory system into activated position, while simultaneously causing disengagement of the seat track locking system 24, thereby allowing for slidable movement of the dumped seat.

Figure 11:
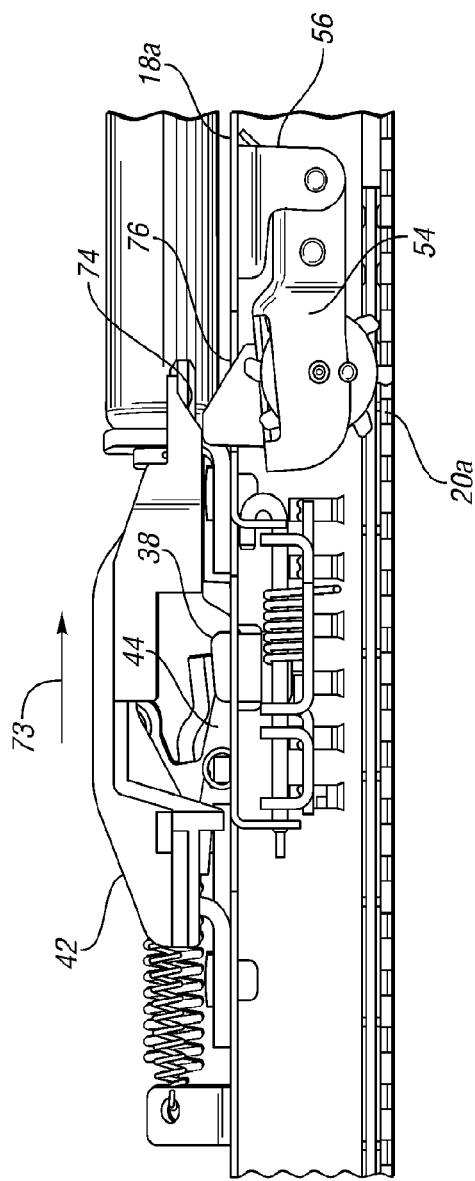
FIG. 11 is a side elevational cross-sectional view of the track assembly (on the memory system side) showing the memory system moving from the non-activated to the activated position.

Referring now to FIGS. 4-6, and 11, the memory system also includes a memory module 54 disposed in one of the pairs of tracks 18a, 20a (hereinafter also referred to as the first pair of tracks). When activated, the memory module 54 is configured to record the travel of the upper track 18a with respect to the lower track 20a, thereby remembering a longitudinal position of the corresponding upper track with respect to the lower track. Referring to FIG. 11, the memory module 54 is pivotally connected to a pivot bracket 56, which is fixed to the first upper track 18a. The memory module 54 is pivotable between a raised, non-activated position (shown in FIG. 17) and a lowered, activated position (shown in FIGS. 11, 13, and 15). Referring now to FIG. 5, the memory module 54 also includes a spring 56 that biases the memory module 54 toward the raised, non-activated position.

Referring now to FIGS. 4-6, the memory module 54 includes a track wheel assembly including a track gear wheel 60 rotatably mounted on a wheel support bracket 62. The wheel support bracket 62 is pivotally mounted on the pivot bracket 56. The track gear wheel 60 is rotatably engageable with the first lower track 20a (see FIGS. 11, 13, and 15) when the memory module 54 is moved to the activated position. The track gear wheel 60 includes a plurality of gear teeth 64 that are configured to extend into notches 66 formed in the first lower track 20a as the track gear wheel 60 moves with respect to the first lower track 20a.

The track gear wheel 60 is also connected to a threaded spindle 64 that receives a threaded memory nut 66. The memory nut 66 has an end stop (not shown) that engages an end stop of the track gear wheel 60 when the memory module is in the memorized position (for example, when the seat has been again moved rearward to its selected use position after the backrest has been dumped and the seat moved forward for ingress or egress to or from the second row seats). The memory module 54 may also include a clock spring (not shown) having one end engaged with the track gear wheel 60 and an opposite end engaged with a plastic disc that is fixed with respect to the wheel support bracket 62 on which the track gear wheel 60 is mounted, such that the clock spring urges the track gear wheel 60 toward an initial position into engagement with the memory nut 66.

Figure 8:
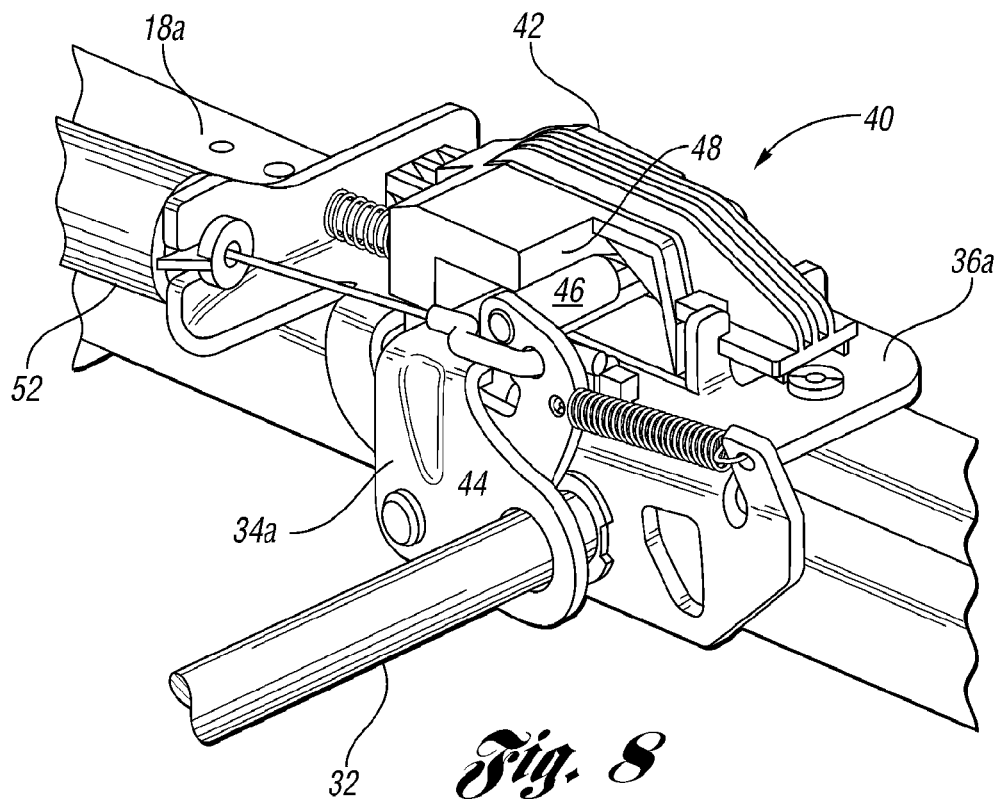
FIG. 8 is a partial forward perspective view of a portion of the track assembly (on the memory system side)

Under normal non-memory operation (i.e., when the memory module 54 is deactivated) the track gear wheel 60 is disengaged from the first lower track 20a, and the position of the first upper track 18a may be fixed with respect to the first lower track by the track locking system (as shown in FIGS. 8 and 9). When the memory module 54 is activated by pivoting the seat back 14 of the vehicle seat forward, each of the track locking assemblies 26, 26a are move from a locked (or engaged) position to a released (or disengaged) position, and the memory module 54 is pivoted downward into the activated position. As previously described, this activation of the memory module is accomplished by actuation of the second actuator.

Figure 15:
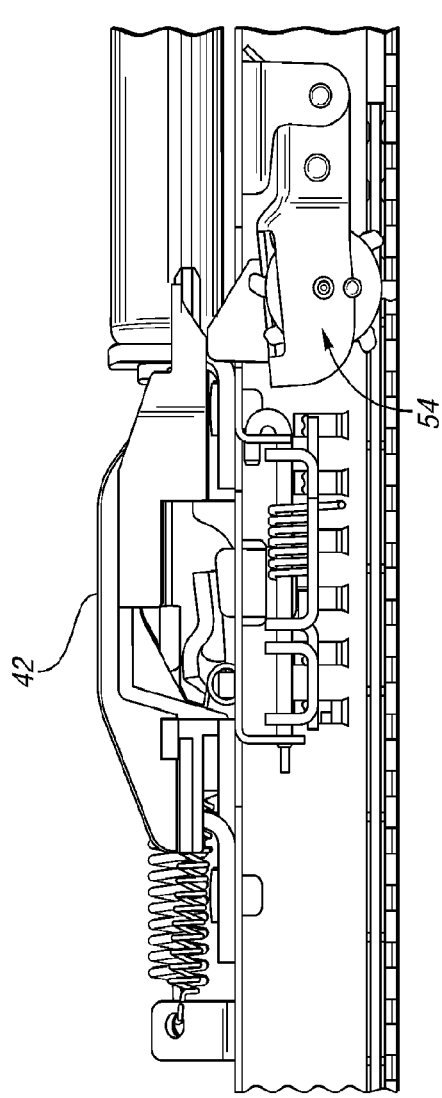
FIG. 15 is a side cross-sectional view of the track assembly (on the memory system side) showing the memory system as it is being deactivated.
Figure 16:
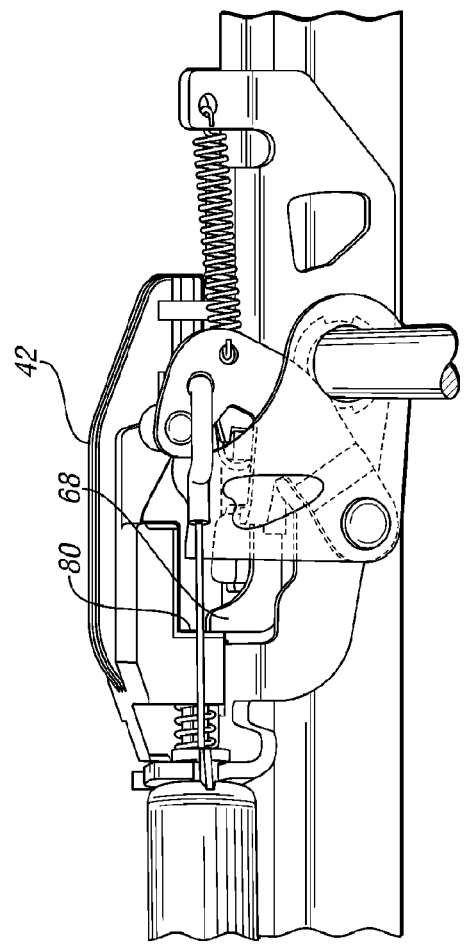
FIG. 16 is a side view of the track assembly (on the memory system side) from the opposite side of the track shown in FIG. 15.

Referring now to FIG. 10, in the disclosed system, the memory module 54 activation system includes a reset lever 68, which is movably mounted on the support bracket 36a and engageable with the sled 42. As shown in FIGS. 8 and 9, when the sled is in the de-activated position (i.e., when it is biased forward by the spring member 50), reset lever 68 is retained in a lowered, non-interference position with respect to the sled 42. As will be explained in further detail below, when the sled is moved by the second actuator into the activated position (i.e., when it is forced rearward by the guidepost 46 as the activating lever 44 is pivoted rearward due to the refraction of the Bowden cable), the reset lever 68 is urged upward by the resilient spring element 70 into the recess 72 on the underside of the sled 42, as is shown in FIGS. 15 and 16.

Figure 17:
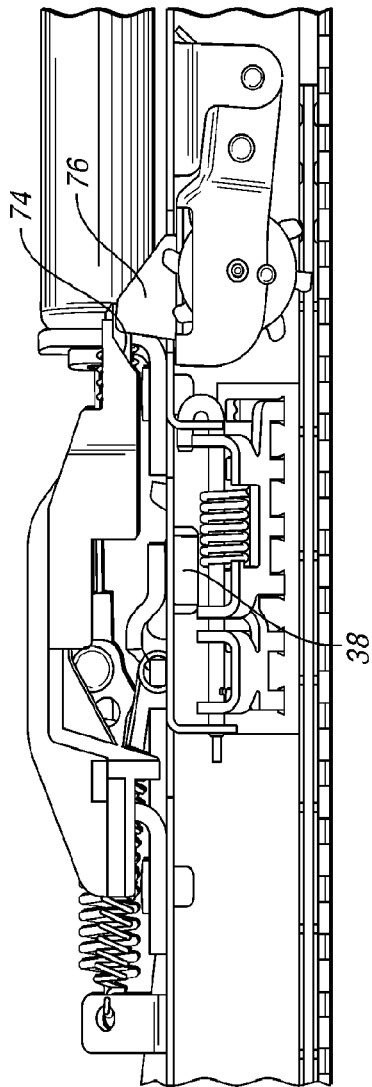
FIG. 17 is a side cross-sectional view of the track assembly (on the memory system side) showing the memory system in the deactivated position.

Operation of the memory system 40 will now be described in greater detail. FIGS. 8 and 9 show the memory system 40 in the deactivated condition, such as when the backrest is upright and the seat is locked in a preferred use position on the track assembly. Similarly, FIG. 10 shows the sled 42 biased by spring member 50 in the de-activated position, and the reset lever 68 in its depressed, interactive position. In this normal use condition, memory module 54 is pivoted upward into its non-activated position by virtue of biasing spring 56, whereby track gear wheel 60 is disengaged from the lower track 20a (as shown in FIG. 17).

To activate the memory system 40, the seatback 14 is pivoted forwardly (or dumped) causing the Bowden cable which interconnects a location on the frame of the backrest to the activation lever 44 to rotate the activation lever, causing the guidepost 46 to contact sled contact surface 48 and urge the sled 42 from its de-activated position rearward to its activated position.

Figure 12:
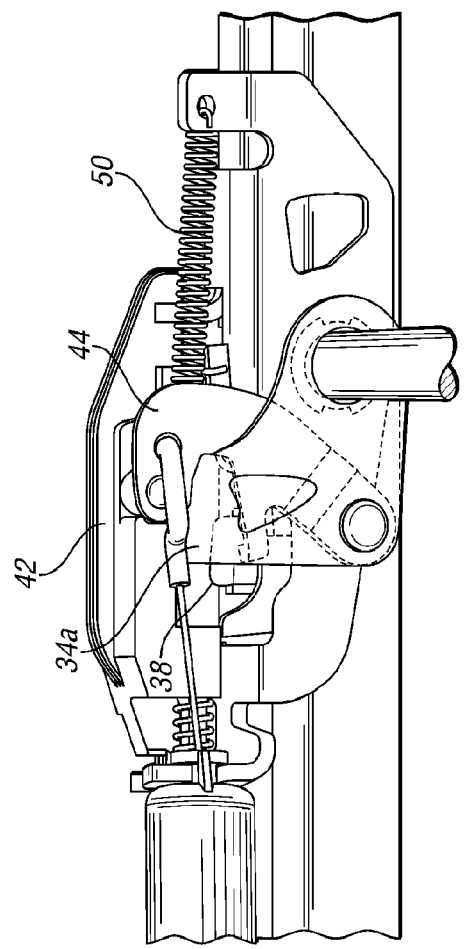
FIG. 12 is a side elevational view of the track assembly (on the memory system side) from the opposite side of the track shown in FIG. 11.

FIGS. 11 and 12 show the relative positions of the memory system 40 components as the seatback 14 is pivoted forwardly and the memory system is moving from the de-activated condition to the activated condition as activation lever 44 is rotated by the Bowden cable, sled 42 slides rearward (in the direction shown by arrow 73 in FIG. 11). As this sled 42 slides rearward, memory module engagement surface 74 contacts a projection 76 formed on the memory module and moves the memory module downward to its activated position, as shown in FIG. 11. After a sufficient amount of rotation of the activating lever 44, the lever 44 also engages the activation bracket 34a so that both the activating lever 44 and the actuation bracket 34a rotate together. Because the activation bracket 34a on the memory side is linked with the activation bracket 34 on the non-memory side, rotation of the activation bracket 34a on the memory side, rotates the crossbar 32 and causes the activation bracket 34 on the non-memory side to rotate as well. As a result, each of the activation brackets 34, 34a engage and the press their respective activating buttons 38, causing disengagement of each of the track locking assemblies, thereby releasing the track locking system.

FIGS. 13 and 14 illustrate the memory system 40 in the activated position. In this position, one end of the reset lever 68 moves upward into the recess 72 on the underside of the sled 42. When the vehicle seat bottom and upper tracks 18, 18a are then moved forward, the engaged track gear wheel 60 rotates along the first lower track 20a, causing the memory nut 66 to move along the threaded spindle 64 away from the gear wheel 60. When the vehicle seat bottom and upper tracks 18, 18a are thereafter moved back toward the last selected use position, the memory nut travels back on the threaded spindle toward the gear wheel until the associated and stops on the memory nut and the gear wheel engage each other, thereby preventing further rearward movement of the vehicle seat bottom and upper tracks 18, 18a with respect to the lower tracks 20, 20a.

Referring to FIGS. 15 and 16, when the vehicle seat bottom is in the memorized position and the backrest 14 is raised to a use position, the Bowden cable no longer pulls on the activation lever 44. As a result, the activation lever 44 and the activation brackets 34, 34a rotate forwardly (i.e., to their inactive positions) through urging by the associated springs, and each of the track locking assemblies 26 return to the locked position. The sled 42, however engages the reset lever 68 along the sled engagement surface 80, such that the memory module 54 is retained in the activated position. Thus, while raising the backrest 14 to its upright (use) position results in loosening the Bowden cable, rotation of the activation brackets 34, 34a to their inactive positions release of buttons 38, and, thereby, re-engagement of the track locking assemblies to lock the seat in position whatever location the backrest is raised to a use position, the memory system is reset only by pulling up on the reset lever 28.

It will be appreciated by those of skill in the art that this disclosed arrangement allows the user to dump the backrest, slide the seat forward, slide the seat back to a position short of the memorized (or originally set) use position, raise the backrest, and lock the seat for use at a position less rearward than the memorized position (such as, for example, when a passenger has occupied the rearward seat, and the front seat passenger wishes to temporarily re-position and lock the front seat at a more forward position to give the rearward passenger more legroom). To return the seat to its memorized position, the backrest may again be dumped forward, thereby disengaging the track locking system, and, since the memory system 40 has not been reset, sliding the seat rearward until further rearward movement is prevented by the memory module 54 as previously described.

Figure 18:
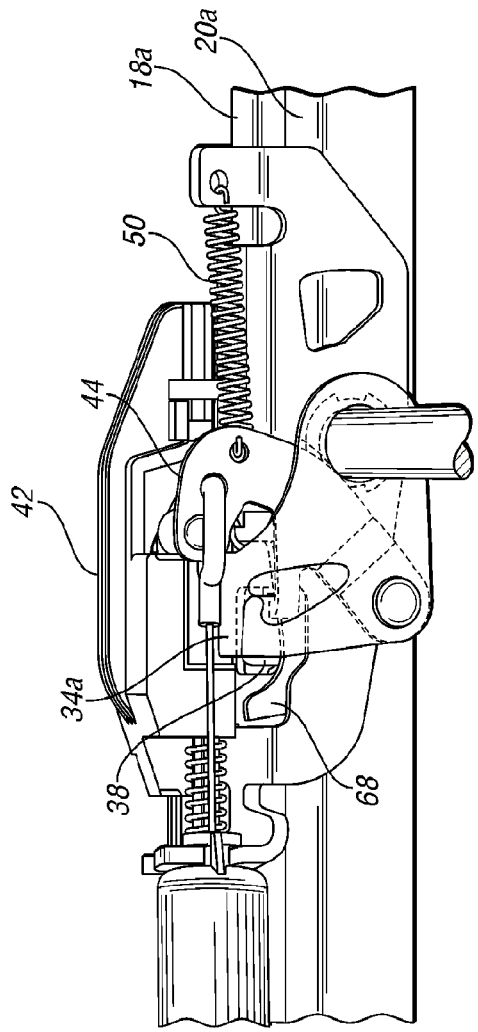
FIG. 18 is a side elevational view of the track assembly (on the memory system side) from the opposite side of the track shown in FIG. 17.

Referring now to FIGS. 17-19, the sled 42 may be released from its activated position (and the memory re-set) when the release lever 28 is rotated upwardly in order to adjust the longitudinal position of the vehicle seat. As a result, both activation brackets 34, 34a rotate rearwardly. Activation bracket 34a then engages the activation lever 44 and rotates it rearwardly. As activation lever 44 rotates rearwardly from its inactive position (i.e., when the lever 44 is not first rotated as a result of being pulled by the Bowden cable), a projection on the activation lever 44 engages a projection on the reset lever 68 (as shown in FIG. 19) and rotates the reset lever downwardly, thereby disengaging the reset lever from the sled. Since the sled is not constrained by the guidepost 46, sled spring member 50 biases the sled back to its non-activated position, memory module engagement surface 74 is moved out of contact with projection 76, and the wheel assembly 60 pivots upward due to its biasing spring out of engagement with the lower track 28. If the vehicle seat is not in the last selected (i.e., memorized) use position when the memory module 54 returns to the non-activated position, the associated clock spring will cause the track gear wheel 60 to rotate back to its initial pit position in which the end stop of the track gear wheel 60 is engaged with the end stop of the memory nut 66, thereby resetting the memory module 54. Thus reset, the memory system will re-activate on the next occurrence of dumping the backrest 14 forward.

It should be noted that, as shown in FIG. 20, the projection on the activation lever 44 is configured such that it does not interfere with the projection on the reset lever 68 (and, thus, does not push the reset lever downward out of contact with the sled 42) when the activation lever is first rotated rearward by the Bowden cable. Thus, dumping the backrest activates the activation lever 44 (which moves the sled to the active position and disengages the track locking system), but does not cause reset the memory system 40.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An adjustable memory track assembly for a vehicle seat including:
    at least one lower rail fixedly attached to a vehicle support structure;
    at least one upper rail fixedly attached to the vehicle seat bottom, and slidably mounted in one of the at least one lower seat rails;
    a track locking system including at least one locking assembly fixedly attached to one of the at least one pair of upper and lower rails, disposed within the other of the pair of rails, and configured to lock the first rail of the pair in a variety of longitudinal positions with respect to the other rail of the pair;
    a first actuator operably connected to the seat track locking system, the first actuator including an elongate release lever attached externally to one of the pairs of nested upper and lower rails and an activation bracket connected to the release lever and movable between a non-activated position and an activated position whereby the activation bracket disengages the seat track locking system to allow slidable longitudinal movement of the seat;

a memory system mounted on one of the at least one pair of rails within the nested pair and engageable with the other of the pair of rails upon activation to record the longitudinal travel of the seat;

a second actuator including an activation lever mounted externally of the nested rail pair for movement from a disengaged position to an engaged position in which the memory module is activated and the seat track locking system is disengaged, to thereby allow forward movement of the seat from the user selected location to a more forward location, and thereafter allow rearward movement of the seat back to, but not past, the user selected location, and a reset lever mounted externally of the pair of nested upper and lower rails to which the memory system is mounted, which reset lever is mounted for movement from an inactive position to an active position whereby the reset lever locks the memory system in its activated condition, and wherein the reset lever is moved from its active to inactive position, and the memory system is thereby reset, only by operation of the first actuator.

2. The adjustable track assembly of claim 1 wherein the track assembly includes first and second pairs of upper and lower rails.

3. The adjustable track assembly of claim 2 wherein the track locking system includes two track locking assemblies, each one disposed, respectively, in one of the first and second pairs of upper and lower rails, and each track locking assembly being configured to lock a respective upper rail in a variety of longitudinal positions with respect to its corresponding lower rail.

4. The adjustable track assembly of claim 3 wherein the release lever is an elongate handle mounted for rotation on a cross bar which extends between the first and second pairs of upper and lower rails, and an activation bracket mounted on each end of the cross tube, each activation bracket being fixedly attached to one rail of one of the pairs of upper and lower rails externally of the nested pair for rotational movement from a disengaged position to an engaged position wherein each activation bracket, respectively, contacts and depresses an activation member, thereby disengaging each of the track locking assemblies.

5. An adjustable memory track assembly for a vehicle seat including:

first and second lower rails each fixedly attached in a spaced apart parallel arrangement to a vehicle support structure;

first and second upper rails each fixedly attached in a spaced apart parallel arrangement to a vehicle seat bottom, each slidably mounted, respectively, in the first and second lower rails;

a track locking system including a pair of locking assemblies, each assembly fixedly attached to one rail of one of the pairs of upper and lower rails, disposed within the other rail of the pair, and configured to lock the first rail of the pair in a variety of longitudinal positions with respect to the other rail of the pair;

a first actuator operably connected to the seat track locking system, the first actuator including,
  an elongate release lever attached externally to one of the pairs of nested upper and lower rails, and
  first and second activation brackets, each operably connected to the release lever and each fixedly attached to one rail of one of the pairs of upper and lower rails externally of the nested pair, each activation bracket being movable between a non-activated position and an activated position whereby the activation bracket disengages the locking assembly associated with the rail to which each bracket is attached, to allow slidable longitudinal movement of the seat;

a memory system mounted on one rail of one of the pairs of upper and lower rails within the nested pair and engageable, upon activation, with the other rail of the pair to record the longitudinal travel of the seat;

a second actuator including an activation lever mounted externally of the nested rail pair upon which the memory system is mounted for movement from a disengaged position to an engaged position in which the memory module is activated, and the seat track locking system is disengaged, to thereby allow forward movement of the seat from the user selected location to a more forward location, and thereafter allow rearward movement of the seat back to, but not past, the user selected location, and a reset lever mounted externally of the pair of nested upper and lower rails to which the memory system is mounted, which reset lever is mounted for movement from an inactive position to an active position whereby the reset lever locks the memory system in its activated condition, and wherein the reset lever is moved from its active to its inactive position, and the memory system is thereby reset, only by operation of the first actuator.

* * * * *